Sept. 22, 1964     E. F. MACKS     3,150,279
BEARING CONSTRUCTION
Original Filed Jan. 14, 1959
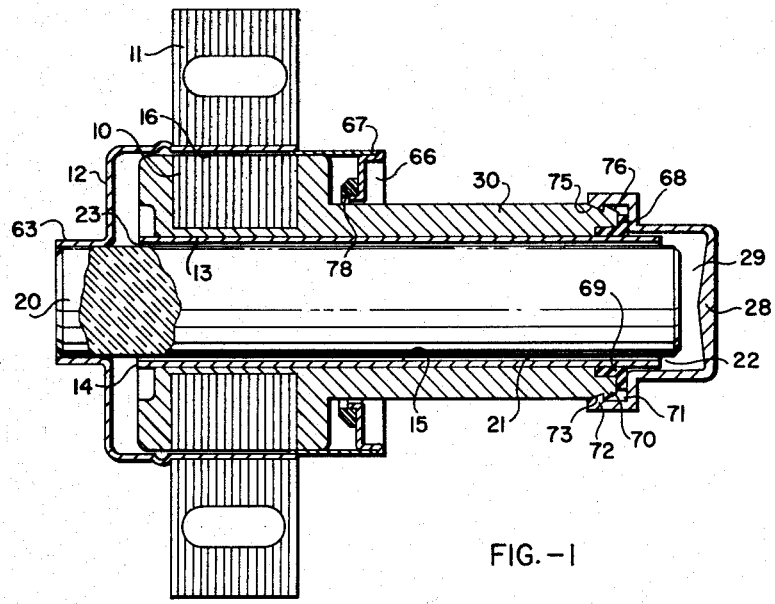
FIG.—1
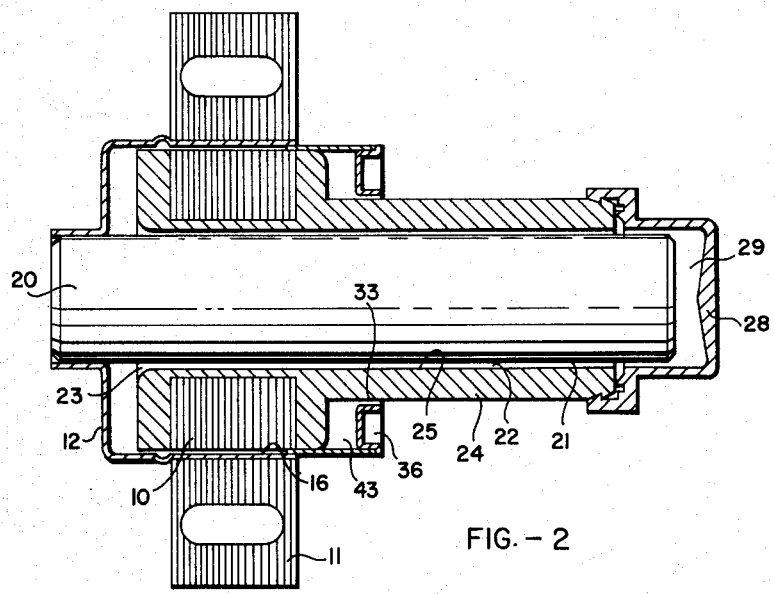
FIG.—2
INVENTOR.
ELMER FRED MACKS
BY Watts & Fisher
ATTORNEY United States Patent Office 3,150,279
Patented Sept. 22, 1964

3,150,279
BEARING CONSTRUCTION
Elmer Fred Macks, Willow Lane, Vermilion, Ohio
Original application Jan. 14, 1959, Ser. No. 786,856.
Divided and this application June 14, 1962, Ser. No. 202,605
7 Claims. (Cl. 310—90)

This invention relates generally to gas lubricating mechanisms, and more specifically to a novel and improved construction of a gas bearing.

This application is a division of my copending application Serial No. 786,856, filed January 14, 1959 for Non-Contacting Dirt Seal.

Gas bearings, which are sometimes referred to as "air bearings," are a relatively old art and the concept that air or other gas can serve as a lubricant to keep two relatively rotating elements in spaced relationship is well-known. However, such bearings have had extremely limited use even in the laboratory, and, until relatively recently, there has been practically no commercial use. One of the principal reasons that air bearings have not been used commercially is that they have been extremely susceptible to premature failure caused by collection of dirt in the air film region.

The permissible tolerances in the formation of gas or pneumodynamic bearings are very precise. The complemental surfaces which define the load-carrying film region must be machined to very close tolerances and clearance spaces in gas or pneumodynamic bearings are generally quite small. Accordingly, collections of relatively small amounts of dirt in the region between the closely spaced surfaces can result in failure.

Air bearings normally have an access opening in at least one dimensional extremity of the fluid film region. This access opening is so termed because it provides access to the ambient atmosphere. The ambient atmosphere and the fluid film region are in communication with one another through the access opening. In accordance with the invention described and claimed in the above-identified copending application, it is possible to construct a non-contacting seal which will mitigate or prevent the entrance of dust particles through the access opening and thereby control the collection of dust in the fluid film region. This is accomplished by controlling the characteristics of the static electricity in the region of the access opening, which static electricity in the absence of such control attracts dust to the access opening and permits its passage into the fluid film region.

This invention relates specifically to the construction of pneumodynamic gas or air bearings which may embody the novel principles described in my copending application, Serial No. 786,856. Pneumodynamic bearings will be understood to mean that class of bearings which generate a load-carrying gas film within the bearings, as contrasted with the class of pneumostatic gas or air bearings which are supplied by an externally pressurized gas in order to support a load.

One of the principle objects of the invention is to provide a novel and improved bearing of the type described which is conveniently constructed as a cartridge unit.

A related object of the invention is to provide a simple, tamper-proof, compact bearing assembly which permits optimum availment of the features described in my co-pending application, Serial No. 786,856, wherein means may be provided to control the static electricity in an access opening to the fluid film region of the bearing in such a manner as to exclude the passage of dust particles through the access opening into the fluid film region.

Another object of the invention is to provide a pneumodynamic gas or air bearing which can be installed and removed easily from conventional dynamoelectric machines.

Still another object of the invention is to provide a novel and improved air bearing assembly that permits great flexibility in manufacture so that one rotor and bearing assembly can be used with any of a variety of stators in dynamoelectric machines.

Other objects and advantages of the invention will become apparent from the following detailed description and the accompanying drawings.

In the drawings:

FIGURE 1 is a cross-sectional view of a dynamoelectric machine in which the stator carries a cartridge unit formed according to the invention, which unit includes rotor, bearing, and dust control means; and, FIGURE 2 is another cross-sectional view of a dynamoelectric machine in which the stator carries a modified cartridge unit.

Both FIGURES 1 and 2 of the drawings disclose dynamoelectric machines in which the rotating components are totally supported on a film of gas when the devices are in operation. These motors are of a class more completely defined in United States Patent No. 2,889,474, issued June 2, 1959, and United States Patent No. 2,983,832, issued May 9, 1961. The patents and copending applications for patents cross-referenced in these cited patents also are pertinent.

As more fully described in my co-pending application, Serial No. 786,856, I have found through an exhaustive series of tests which have been conducted with motors of the type described that it is possible to mitigate the ingress of dirt into an air bearing film region so completely as to practically, if not completely, eliminate dirt. The result is that it is now possible to construct an air bearing which, under even adverse conditions, has a relatively long a life expectancy.

The explanation for this phenomenal improvement appears to lie in the controlling of static electricity built up in the relatively rotating elements. For example, in motors of the type described above, static electricity charges are built up which are very small but which nonetheless attract dirt particles. I have shown that it is possible to control the static electricity by controlling its intensity and by neutralizing it. In at least some instances, it is also possible to use the static electricity to advantage in reducing or eliminating entry of dirt particles into the fluid film region.

This control of static electricity that was found to attract dirt into the fluid film region has been accomplished by a novel construction wherein one or more of the relatively rotating parts are formed of an insulating material. This insulating material will build up and retain a charge of static electricity. Dust particles of like charge will be repelled and thereafter will not enter the access opening of the bearing. Dust particles of opposite charge will be attracted to the insulating material and assume a like charge. The dust particles having once assumed the like charge will then be repelled. This phenomenon is believed to be one reason why dust does not pass through the access apertures in air bearings constructed according to my previous invention.

In the drawings; the preferred novel and improved cartridge unit non-contacting seal construction of the present invention is illustrated as including an insulating material for controlling the characteristics of the static electricity in the region of the access opening. While the present invention is shown as applied to an electric motor, it is to be understood that the invention is applicable to any rotating machine in which a gas bearing can be used. Further, it is to be understood that the present invention contemplates a gas bearing construction which does not necessarily include means for controlling the static electricity.

Referring now to the embodiments of FIGS. 1 and 2, a rotor 10 and a stator 11 are shown. In each case the rotor and stator 10, 11 comprise the electrical components of an electric induction motor. In the disclosed arrangement, the rotor 10 is the armature and the stator 11 is the field. The rotor 10 is disposed in an axial stator bore 16. A bracket 12 is fixed to the stator 11 in a manner which will prevent gas from the ambient atmosphere from passing between the stator 11 and the bracket 12. The rotor or armature 10 has a through axial bore 13 which receives a sleeve or bushing. The sleeves are designated in FIGS. 1 and 2 by reference numerals 14 and 24, respectively. Preferably, each of the sleeves is fixed to the rotor 10 so that they form a part of the rotor. Each of the sleeves is a tubular member having a cylindrically contoured inner surface designated by reference numerals 15 and 25, respectively.

A pin 20, which might be referred to as a stationary shaft, is affixed to the bracket 12. The pin 20 in each case projects into and preferably through the sleeve and therefore through the bores of the rotor and stator 10, 11. In instances where it is desired to control the static electricity in the region of the access opening, the pin 20 preferably is made of a hard, insulating material, as for example, glass. Glass is preferred because it is an excellent insulator which has good dimensional stability and is relatively impervious to attack by humidity and acid, has good friction and wear properties for the application involved, and is low in cost and relatively easy to form to the required close tolerances. The pin 20 has a cylindrically contoured outer surface 21 which is complemental in each case to a respective rotor sleeve inner surfaces 15 and 25.

A load-carrying, gas film region 22 is defined by the pin surface 21 in the various sleeve inner surfaces. For clarity of illustration, the radial dimensions of the region 22 have been greatly exaggerated. An actual operable clearance may be of the order of 0.0005 inch per inch diameter. The region 22 may be referred to as a pneumodynamic film region. The bearings disclosed in each of the two figures are radial load-carrying bearings of the fluid dynamic type. Since they are gas bearings, they are referred to as pneumodynamic bearings.

Pneumodynamic bearings are air bearings in which the load-carrying film is generated by the coaction of the complemental bearing surfaces upon the relative rotation of the elements. In such bearings, regions of positive and negative pressure are built up circumferentially spaced locations. In those regions where there is negative pressure, the pressure of the ambient atmosphere may force ambient gas into the regions. In those areas where there is positive pressure, gas may be forced out of the fluid film region. Also, during start and stop operations temperature differences between the gas film region and the ambient gas may cause flow into or out of the fluid film region of a pneumodynamic bearing. Accordingly, bearings of a pneumodynamic type are referred to as bearings which "breathe." Since they breathe, they must communicate with the ambient atmosphere through some access opening. In the structures illustrated in FIGS. 1 and 2, there is, in each case, one direct access opening in the fluid film region 22. In each embodiment, this direct access opening is designated by reference numeral 23.

In the construction shown, an end cap 28 is fixed to the end of each of the sleeves 14 and 24 at the end which is remote from the access opening 23. The end cap 28 seals off the outer end of the fluid film region 22. A quantity of gas is trapped in the cavity 29 defined in part by the end cap 28. The air trapped in the cavity 29 serves to give axial stability to the device. The features of this concept of axial stability or location are disclosed more completely in U.S. Patent 2,928,960, issued March 15, 1960.

Referring particularly to FIG. 1, the sleeve 14, like the pin 20, may be made of a hard, insulating material, such as glass. The sleeve 14 and rotor 10 are fixed together in a manner which subsequently will be described in more detail. The sleeve 14 is surrounded by the rotor 10 which includes an outer supplemental, reinforcing sleeve portion 30. The reinforcing sleeve 30 is provided to facilitate the connection of the end cap 28 as well as to protect the glass sleeve 14. In the illustrated embodiment of FIG. 1, static electricity control is affected when the pin 20 and the sleeve 14 are formed of glass.

The rotor 10 may be die cast to include the reinforcing or supplemental sleeve 30 as an integral part or extension thereof. The sleeve 14 fits snugly but nonetheless freely into the rotor 10 and the supplemental sleeve extension 30. The housing bracket 12 projects through the bore 16 of the stator.

In assembly, the pin 20 is press-connected to an end wall 63 of the bracket 12. Next the glass sleeve 14 is pressed into the bore 12 and temporarily held in place by a retaining washer 68 which is made of a soft, flexible and pliable material such as synthetic rubber. The rotor-sleeve assembly is slid over the pin 20 and an annular flanged insert 66 is snapped into the end 67 of bracket 12. The end cap 28 is then positioned over the end of the supplemental sleeve 30 in such a fashion as to squeeze the retaining washer 68 between a shoulder 71 on the end cap and the end 70 of the sleeve extension. Assembly in this manner allows a precision bore sleeve 14 to be employed and eliminates the need for re-finishing of the sleeve bore after assembly as is necessary if the sleeve is press-fitted into the rotor 10.

The end cap 28 is a snap-on member made of a suitable resilient material such as nylon. The end cap 28 has a locking ring portion 72 which is somewhat tooth-shaped in cross-section. The locking ring 72 is retained in a retaining ring 73 formed in the periphery of the supplemental sleeve 30. The end cap 28 and the supplemental sleeve 30 include complemental camming surfaces 75, 76 respectively. The camming surfaces 75, 76 cause the tooth-shaped locking portion 72 to be flared radially outwardly when the end cap is telescoped over the end of the supplemental rotor 30. The ring then snaps inwardly into the retaining grooves 73 to hold the end cap 28 in place with the annular washer member 68 squeezed between the end 69 and the shoulder 71 causing an air-tight seal.

An annular rub ring 78 may be fixed to the retaining end cap 66. The rub ring has as its primary function the elimination of noise on starting and stopping of the motor if the rotor 10 is shifted axially until it contacts the ring 78 as may happen in the vertical application after a long shut-down. As soon as the motor is started up, the magnetic field will draw the rotor into position and provide axial location.

It will be seen that the entire assembly of FIGURE 1, other than the stator 11, is a cartridge unit. This cartridge unit is simply snapped into the bore 16 of the stator 11 for assembly. It may be removed by the same technique. The assembly provides greater flexibility of manufacture in which one rotor and bearing assembly, which may, although not necessarily, include means to control the static electricity, can be used with any of a wide variety of stators as long as the bore in the stator is of the appropriate size. It provides a simple, tamper-proof compact assembly which is particularly adapted to include means for control of the static electricity in the region of the access opening.

As shown in FIG. 2, the rotor 10 is a die cast rotor as in the preferred arrangement of FIG. 1. Through this construction, the rotor 10 and the sleeve 24 are integrally formed as one element. The inner surface 25 of the sleeve-rotor 24, 10 may be hard anodized to provide an insulating surface which, in conjunction with a hard anodized pin, from theoretical considerations act in the same fashion as the embodiment illustrated in FIG. 1.

Further, the embodiment of FIG. 2 has a supplemental, serially related access aperture 33 which may be provided in applications having extremely dirty conditions. This supplemental access aperture 33 is defined by the bracket 12, the sleeve portion 24, and an annular ring insert 36 which is carried by the bracket 12. The insert 36 is similar to the previously described insert 66. Communication between the serially related access openings 23, 33, is provided by the space between the rotor and bracket.

The sleeve portion 24 and the insert 36 also may be made of insulating material to function like the pin and sleeve 20, 14 of FIG. 1. Alternatively, as disclosed above, the sleeve and insert 24, 36 each may be coated with a suitable insulating material, as by painting, anodizing or printing. The insulating material coated on the insert 36 and sleeve portion repel dirt in the same way as it is repelled by the pin and sleeve 20, 14. It will be seen that the insulating coatings in the supplemental access opening 33 may be used as the only dust control means if it is desired to eliminate the control means at 23. Such coating also may be applied to the ends of the pin or sleeve formed like any of those shown but of conducting material.

While the invention has been described with a great deal of clarity and detail, it is believed that it essentially comprises a novel and improved cartridge unit, gas bearing construction, which bearing includes means to control the static electricity in an access opening to a fluid film region of the bearing.

Many modifications and variations of the invention will be obvious to those skilled in the art in view of the foregoing detailed disclosure. Therefore, it is to be understood that, within the scope of the appended claims, the invention may be practiced otherwise than as specifically shown and described.

What is claimed is:

1. An article of manufacture including first and second relatively rotatable assemblies, said first assembly including a pin member, the second assembly including a sleeve support tube, a sleeve member supported within the tube and telescoped over the pin to define a complemental pneumatic load-carrying film producing region therebetween, an end cap secured to the tube and spaced from the pin to provide a trapped pocket of air therebetween, and an annular deformable ring squeezed between the cap and the tube and pressed against the sleeve to prevent relative axial movement of the sleeve.

2. The article of claim 1 wherein the end cap is snap-connected to the tube.

3. The article of claim 2 wherein the article is a dynamoelectric machine and wherein the first assembly is the stator and the second assembly is the rotor.

4. The article of claim 3 wherein the machine is an A.C. induction motor.

5. In a dynamoelectric machine, the improvement which comprises an annular bracket for frictional insertion into the bore of a stator, said bracket having first and second walls, an end wall closing the bracket first end, a pin fixed to the end wall and extending coaxially past the second end of the bracket, a rotor disposed in part of the bracket and telescoped over the end, said rotor extending past said bracket second end, said rotor having an outer end external of said bracket, a retaining insert connected to said bracket second end and retaining said rotor portion within said bracket, a sleeve interposed between the pin and the rotor, an annular, deformable gasket interposed between the end cap and said rotor outer end and between the rotor and the sleeve, said end cap and rotor being fixed together and said gasket being squeezed therebetween in said sleeve, said sleeve and rotor being held in fixed relationship by said gasket, and said sleeve and pin having complemental cylindrically contoured surfaces defining a pneumodynamic film-producing region therebetween, said region being in communication with the ambient atmosphere, and said rotor, said sleeve and said cap being totally supported on a load-carrying ambient gas film generated in said region when the device is in operation.

6. An article of manufacture comprising first and second relatively rotatable assemblies, said first assembly including a pin, said second assembly including a sleeve spacedly surrounding said pin to form a load-carrying film producing region therebetween, a removable end cap connected to one end of said sleeve and spaced from the corresponding end of said pin to provide a trapped pocket of air therebetween, means forming a direct access opening to said region at the end of said sleeve opposite said one end, a bracket connected to one end of said pin and surrounding said opposite end of said sleeve, said bracket having a fixed end wall, and a removable insert secured to said bracket in opposition to said fixed end wall.

7. In a dynamoelectric machine including a stator having an axial bore, the improvement comprising a cartridge unit removably assembled within said axial bore, said cartridge unit including a bracket engaged in the bore of said stator, a pin carried by said bracket and extending through said axial bore, a rotor assembly including a sleeve telescoped over said pin, said sleeve and said pin having spaced complemental surfaces which define a pneumatic load-carrying film producing region, a resilient end cap removably secured to one end of said sleeve in spaced relationship with the corresponding end of said pin, said end cap defining a trapped pocket of air in communication with said region, and a retaining insert removably connected to one end of said bracket around said sleeve.

No references cited.